United States Patent [19]
Endo

[11] Patent Number: 4,547,129
[45] Date of Patent: Oct. 15, 1985

[54] AIR STREAM GENERATING APPARATUS

[75] Inventor: Kiyomu Endo, Tokyo, Japan

[73] Assignee: Keiko Endo, Tokyo, Japan

[21] Appl. No.: 567,787

[22] Filed: Jan. 3, 1984

[30] Foreign Application Priority Data

May 13, 1983 [JP] Japan .................................. 58-82535

[51] Int. Cl.[4] .......................... F04B 37/02; B03C 1/00
[52] U.S. Cl. ........................................ 417/48; 55/100;
 55/138; 55/151; 55/154
[58] Field of Search ................... 417/48; 55/2, 3, 138,
 55/151, 152, 100, 154

[56] References Cited
U.S. PATENT DOCUMENTS

| | | | |
|---|---|---|---|
| 2,443,780 | 6/1948 | Wintermute | 55/100 |
| 2,789,658 | 4/1957 | Wintermute | 55/100 |
| 4,351,648 | 9/1982 | Penney | 55/138 X |

Primary Examiner—Edward K. Look
Attorney, Agent, or Firm—Michael J. Striker

[57] ABSTRACT

An air flow generating apparatus relating to an apparatus for generating air stream by corona discharge without a mechanically operating section and is used for an air cleaning apparatus or an air conditioner. This apparatus has a plurality of electrode plates arranged at a predetermined interval to form an air flow passage, a number of ionizing wires arranged at predetermined intervals at a position from the ends of the electrode plates, and rod-shaped magnets attached to the ends of the respective electrode plates. Since ions produced by corona discharge are accelerated magnetically by the magnets, ion flowing velocity is accelerated, thereby remarkably increasing the velocity and air pressure of the air stream generated.

8 Claims, 9 Drawing Figures

F I G. 8
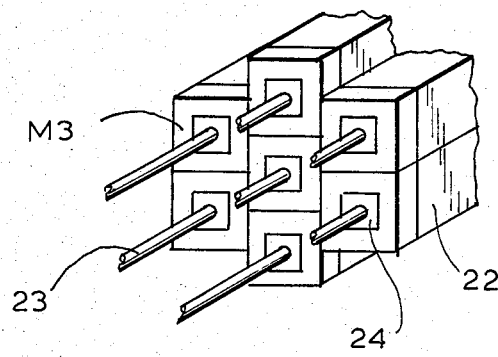
F I G. 9
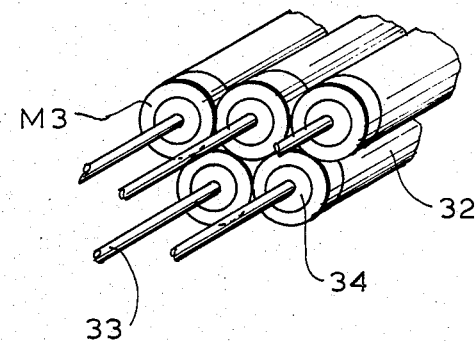

AIR STREAM GENERATING APPARATUS

BACKGROUND OF THE INVENTION

1. Field of the Invention

The present invention relates to an air stream generating apparatus and, more particularly, to an air stream generating apparatus which increases air flow rate and wind pressure.

2. Description of the Prior Art

A conventional air stream generating apparatus will be described with an example used in an air cleaning apparatus with reference to FIG. 1. In FIG. 1, reference numeral 1 designates dust collecting electrode plates, which are arranged at a predetermined interval along an air flow passage. Ionizing wires 2 are respectively installed at the outside position isolated at a distance r from the line connecting the ends 1a of the respective electrode plates 1 on extension lines from substantially central positions of the gaps between the electrode plates 1. A predetermined high voltage of approx. 15 KV is applied to the electrode plates 1 as negative polarity between the ionizing wires 2 and the electrode plates 1 from a power source E. A corona discharge is produced between the wires 3 and the electrode plates 1 upon application of the voltage between wires 3 and the electrodes 1, thereby imparting kinetic energy to the viscous gas molecules to generate an air stream directed from the wires 2 toward the intervals when numerous positive ions are attracted to the side of the electrode plates 1. When the air stream is produced, dust particles in the air are charged with positive ions and are collected on the dust collecting electrode plates 1.

A force for producing an air stream in the interval when a voltage supplied from the power source E to between the wires 2 and the electrode plates 1 is constant, is, as shown in FIG. 1, given by the component force Fcos θ of the force F directed from the wire 3 to the electrode plate 1, where the θ is an opening angle from the line directed toward the central position of the gap from the wire 2 as an origin and the line for connecting the ends 1a of the electrode plates 1. When the distance r approaches to 0 in this case, the angle θ approaches 90° and accordingly the force Fcos θ approaches 0. Thus, the force for producing the air stream is substantially vanished. When the distance r is, on the other hand, increased, an electric field between the wire 2 and the end 1a of the electrode plate decreases proportionally by $1/r^2$, thereby remarkably weakening the corona discharge. Thus, similarly to the above, the air stream is substantially vanished. In this manner, when the voltage supplied from the power source is constant, an adequate value exists in the set range of the distance r, thereby defining the velocity of the air stream to be produced substantially to a predetermined value of approx. 0.5 to 2 m/sec.

The volume and the cleaning efficiency of a cleaning chamber to be cleaned by an air cleaning apparatus are different depending upon the purpose for using the cleaning chamber. Thus, an air flow generating apparatus used in the air cleaning apparatus requires the performance capability of generating an air flow rate and an air pressure larger than the above-described values corresponding to them. The above-described example has been described with an example of the air flow generating apparatus used in the air cleaning apparatus. However, when this example is applied to an air conditioner (a room cooling and heating apparatus), the apparatus requires air flow velocity and air pressure (static and dynamic pressures) much larger than the value obtained in the conventional apparatus.

However, in the conventional air flow generating apparatus, there are disadvantages such that the velocity and air pressure of the air stream to be produced are defined substantially to a predetermined value which is slightly lower than the degree to be insufficient as desired when the high voltage of the power source is defined to a constant value.

SUMMARY OF THE INVENTION

It is therefore an object of the present invention to provide an air flow generating apparatus which comprises a plurality of electrode plates arranged at a predetermined interval to become air flow passage in a casing having an air flow inlet and outlet, ionizing wires installed at a predetermined distance substantially from the central positions of the respective intervals between the electrode plates on extension lines from a line for connecting the edges of the electrode plates for producing corona discharge between the electrode plates and the wires, and rod-shaped magnets attached to the ends of the respective electrode plate for magnetically accelerating the ions produced by the corona discharge.

According to the present invention, since the ions produced by the corona discharge are accelerated by both an electric field and a magnetic field produced as described above, the ion flowing velocity is accelerated to remarkably increase the air flow velocity and air pressure thus produced, and when this is applied to the air cleaning apparatus, the air cleaning efficiency can be significantly improved. When this is also applied to the air cleaning apparatus, equivalent air flow velocity to that of the conventional apparatus can be obtained with less discharge voltage. Accordingly, the amount of produced ozone upon discharging can be reduced. Further, when this is applied to an apparatus such as a blower for an air conditioner which requires relatively large air flow velocity and air pressure, the air flow velocity and air pressure can be remarkably increased. Consequently, an air flow generating apparatus which is useful for improving the increases in the air flow velocity and air pressure without production of mechanical noise can be provided.

According to another aspect of the present invention, there is provided an air flow generating apparatus which comprises a plurality of cylindrical electrodes of honeycomb-shaped section having a plurality of unit cell spaces as air flow passages, a plurality of stylus-shaped ionizing wires arranged at a predetermined interval from the edge of openings of the unit cells toward the openings of the unit cells for producing corona discharge between the electrodes and the styluses, and a plurality of magnets attached to the edges of the openings of the unit cells for magnetically accelerating the ions produced by the corona discharge. Thus, since the electrodes can be readily arranged, the air flow velocity and air pressure can be further increased.

Many other features, advantages and additional objects of the present invention will become manifest to those versed in the art upon making reference to the detailed description which follows and the accompanying sheet of drawings.

BRIEF DESCRIPTION OF THE DRAWINGS

FIGS. 2 to 5 show an embodiment of an air flow generating apparatus according to the present invention, wherein FIG. 2 is a partially sectioned front view of the apparatus present invention;

FIG. 3 is a partially sectional plan view of the apparatus present invention;

FIG. 4 is a circuit diagram showing a connecting relationship between ionizing wires, electrode plates and a power source;

FIG. 5 is a perspective view showing the state of attachment of the rod-shaped magnets to the respective electrode plates;

FIGS. 8 and 9 are perspective views showing two additional embodiments of the apparatus according to the present invention.

DETAILED DESCRIPTION OF THE PREFERRED EMBODIMENTS

Figure 1:
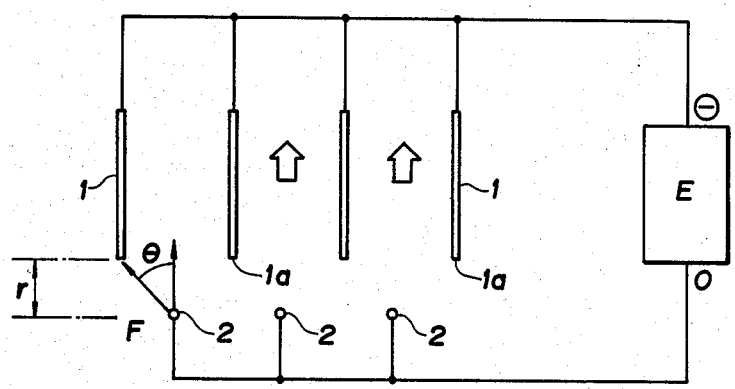
FIG. 1 is a schematic showing a conventional air flow generating apparatus.
Figure 4:
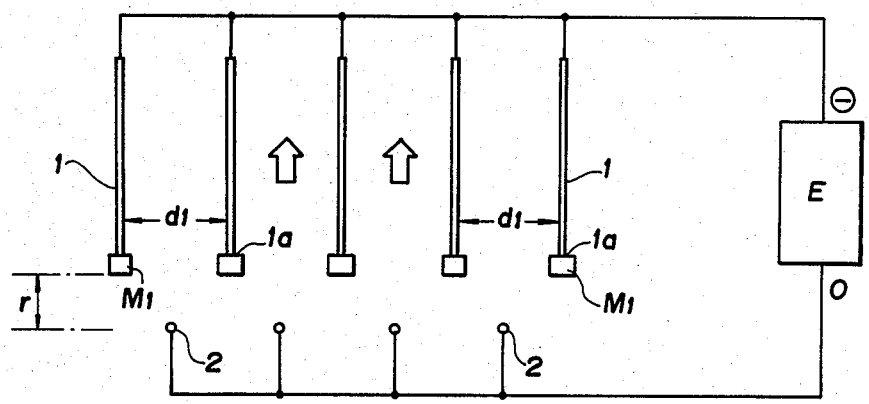
Figure 2:
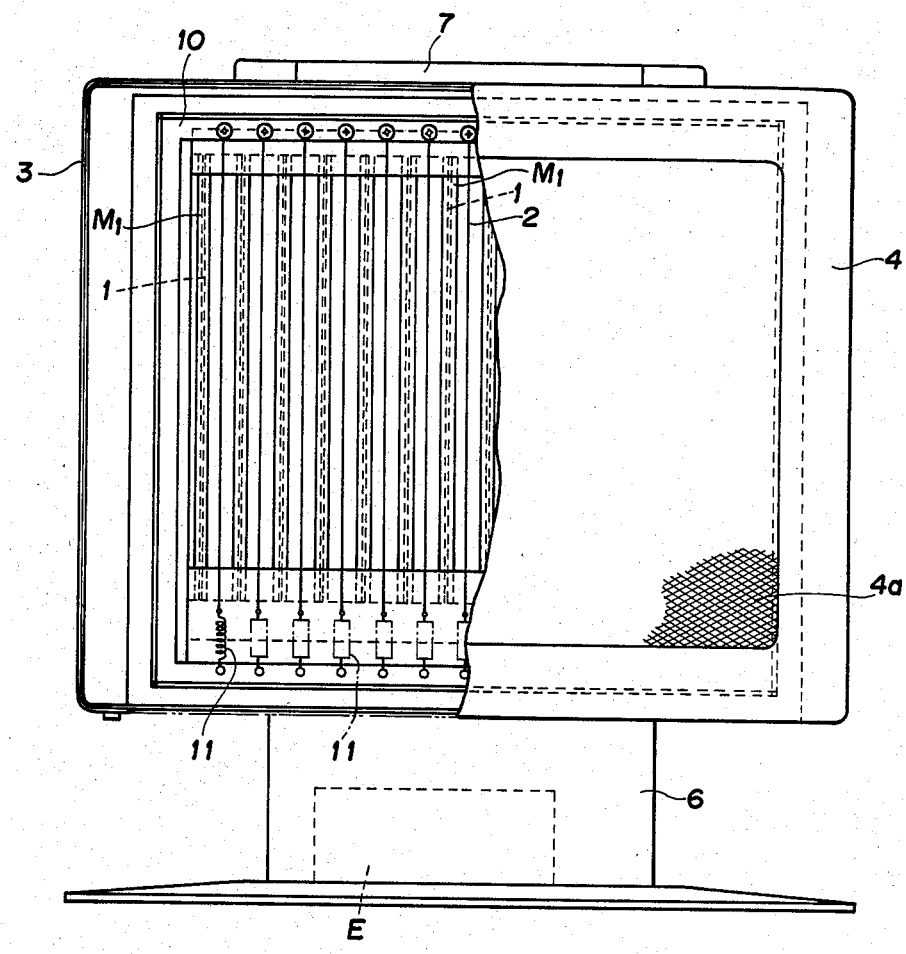
Figure 5:
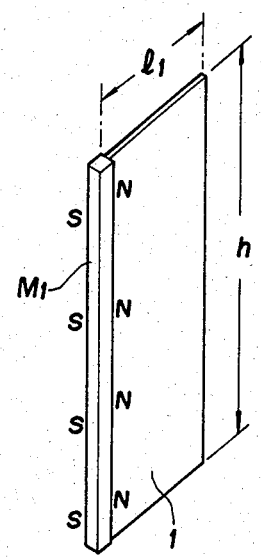
Figure 6:
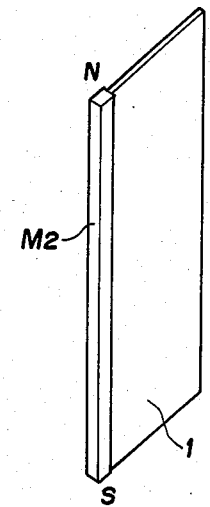
FIG. 6 is a perspective view similar to FIG. 5 but showing a modified example of the magnets applied.

As shown in FIG. 1, in the prior art case when a voltage is applied between the electrode plates 1 and the ionizing wires 2 with the electrode plates 1 having negative polarity, ions produced by a corona discharge are, when rod-shaped magnets having S-poles on the front end faces of the wires 2 and N-poles of the back surfaces thereof are attached as shown in FIG. 5 to the ends 1a of the respective electrode plates 1 (to be described later), accelerated by the magnetic field produced by the magnets, thereby increasing the velocity and air pressure of the air thus produced. Further, another fact has also been discovered that the velocity and the air pressure of the air flow can be increased not only in the case when the rod-shaped magnets have S-poles on the front end faces and N-poles on the back surfaces thereof, but in the case when the magnets have N-poles and S-poles at both ends of the longitudinal direction of the rod magnets as shown in FIG. 6. In this manner, when the rod-shaped magnets $M_1$ or $M_2$, made of suitable intensity of magnetism, are respectively attached to the ends 1a of the respective electrode plates 1 without respect for the direction and intensity of the poles, the velocity and air pressure of the air flow can be increased from the experimental facts.

The present invention will be described with reference to the accompanying drawings. FIGS. 2 to 5 show an embodiment applied to an air cleaning apparatus according to the present invention. In the drawings after FIG. 2, like reference numerals identify like elements in FIG. 1 and the same description will be omitted.

Figure 3:
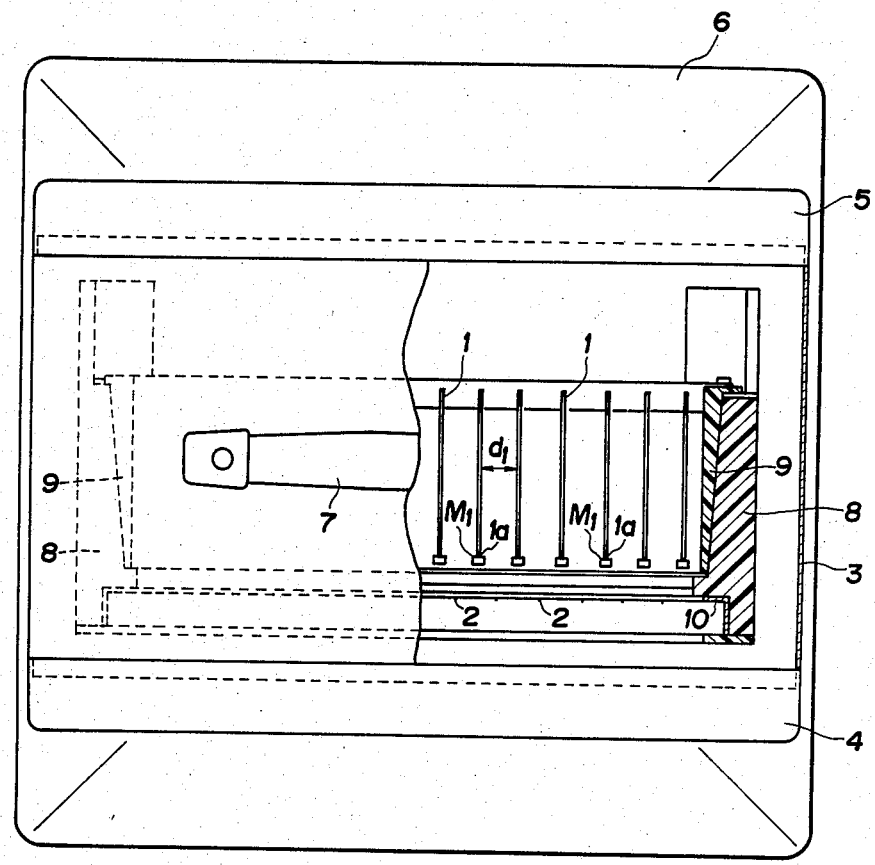

In the construction, in FIGS. 2 to 5, reference numeral 3 designates a casing, in which inlet and outlet side masks 4 and 5 respectively having mask nets 4a and 5a are detachably mounted to become the air flow inlet and outlet, positioned at the top and the bottom of in FIG. 3. A stand 6 is mounted at the lower portion of the casing 3, and a handle 7 is mounted on the top of the casing 3. This is constructed as a portable type, capable of being installed at an arbitrary position in the exemplified embodiment.

The casing 3 has therein functional units which respectively have the ionizing function, the dust collecting function and the ozone decomposing function. More particularly, a unit containing frame 8 is fixedly secured substantially to the center of the casing 3, and a dust collecting unit frame 9 is detachably mounted on the frame 8. The frame 9 has a plurality of dust collecting electrode plates 1 aligned at predetermined intervals $d_1$. The electrode plates 1 are commonly connected together through a suitable terminal board and to one terminal of a power source E. In the present invention, rod-shaped magnets $M_1$ are respectively attached to the ends 1a of the respective electrode plates 1. The magnet $M_1$ employs, as shown in FIG. 5, N-poles on the side faces attached to the electrode plates 1 and S-poles on the front end faces (which are the ionizing wire sides)

The front side of the unit containing frame 8 is slightly expanded. Ionizing unit frames 10 formed of metal are engaged with the expanded portion. The ionizing wires 2 are installed between upper and lower beams of the frame 10. The wires 2 have a coil spring 11 elastically extended at the lower portion thereof. The wires 2 are defined in this installed state, at the isolated position, at a predetermined distance r from a line which connects the front edges 1a of the electrode plates 1 on the front extension line substantially from the central positions of the gaps between the electrode plates 1. The wires 2 are connected to the other terminal of the power source E via lead wires led from the frame 10.

The materials and the dimensions of the respective members will be described. The rod-shaped magnets $M_1$, $M_2$ are formed of square rod shaped ferrite having $2.2 \times 2.2$ mm in section and approx. 100 mm in length. The electrode plate 1 is formed from a brass plate having a base approx. 0.4 to 0.8 mm thick and plated with a noble metal for accelerating ozone decomposition. The electrode plate 1 has a of width $l_1$ equal to 20 mm and a height h equal to approx. 100 mm. The interval length $d_1$ formed by the electrode plates 1 is approx. 18.5 mm. Further, the wires 2 are formed of tungsten having approx. 60 $\mu\phi$ of thickness, and are treated with a noble metal plating layer similar to the above. The distance r between a line for connecting the edges 1a of the electrode plates 1 and the wire 2 is approx. 13 mm.

It is noted that the direction of magnetization of the rod-shaped magnet $M_1$, attached as described above, is not limited to that in the above embodiment, but can be applied with the magnet $M_2$ having the N-poles and S-poles at both ends of the longitudinal direction as shown in FIG. 6 In the magnet $M_2$ having the polarity as described above, a permanent magnet may also be employed and an electromagnet wound with coils on a suitable position may also be adopted within the scope of the present invention.

The operation the above embodiment of the air flow generating apparatus will be described.

When a power switch (not shown) is closed (ON) applying a high voltage of a predetermined value with the electrode plates 1 having negative polarity between the ionizing wires 2 and the electrode plates 1, corona discharges are produced between the wires 2 and in the vicinity of the ends 1a of the electrode plates 1. The numerous positive ions generated by the corona discharges have a tendency of moving toward the electrode plates 1 side because of an electric field produced between the electrode plates 1 and the wires 2. Simultaneously with the moving trend caused the electric field, the positive ions are attracted by the magnetic field of the magnets $M_1$ and accordingly accelerated in flow velocity. When the numerous ions are moved toward the electrode plates 1 side, their kinetic energy is applied to the viscous gas particles, a type of air stream is generated in this manner, and thereby producing an air stream flowing toward the interval from the wires 2 side toward the electrode plates 1 side. The ion accelerating operations caused by the magnets $M_1$ in the course of generating the air stream are produced substantially in the same manner even if any of the pole states shown in FIGS. 5 and 6 is applied. The reason why the above-described ion accelerating operations are produced as described above even by the magnets $M_2$ having N-poles and S-poles at both ends of the rod-shaped magnets as shown in FIG. 6 is because it is considered that a similar operation in the new magnetizing operation is produced in the magnets $M_2$ due to a high electric field produced between the wires 2 and the electrode plates 1, thereby operating the magnetization produced at the front end faces and the back surfaces similarly to the magnets $M_1$ which has the pole states shown in FIG. 5 to accelerate the ions.

Examples of numeral data such as applied voltage value and the velocity of the generated air stream will be described. The magnetic flux density in the air interval between the wires 2 with the pole states of the magnets shown in FIG. 5 was approx. 3,400 gauss. The velocity of the air stream obtained when $-6$ KV was applied between the wires 2 grounded and the electrode plates 1 was approx. 2 m/sec. (as compared to 0.6 m/sec. in the prior art example shown in FIG. 1, and the fully sealed static pressure was 0.3 mmAg as compared to the 0.1 mmAg in the prior art example shown in FIG. 1). When the voltage applied to the electrode plates 1 was $-13$ KV, the velocity of the air stream was approx. 6 m/sec. as compared to the 1.5 m/sec. in the the prior art example shown in FIG. 1, and fully sealed static pressure was 0.9 mmAg as compared to the 0.2 mmAg in the prior art example shown in FIG. 1.

Similar results to the above case could be obtained even if the electrode plates 1 were grounded and a high negative voltage was applied to the wires 2 side. At this time, the pole state of the magnets $M_1$ is reverse to that in FIG. 5.

Figure 7:
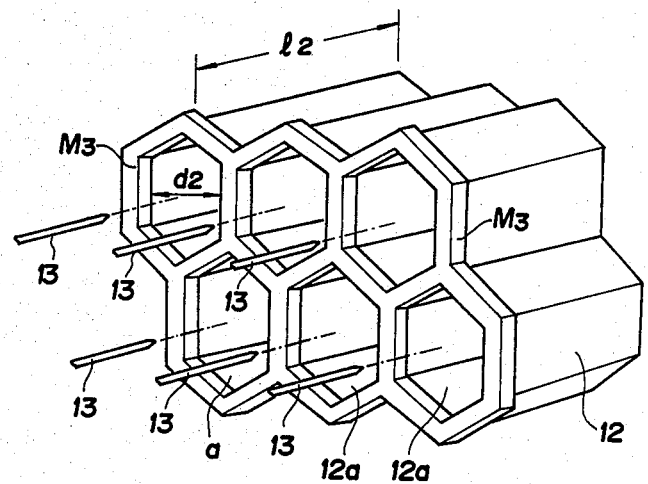
FIG. 7 is a perspective view showing another embodiment of the apparatus according to the present invention.

FIG. 7 shows another embodiment of an apparatus according to the present invention. In this embodiment, cylindrical electrodes 12 of honeycomb shape in section are employed instead of the electrode plates, and stylus-shaped ionizing wires 13 are adopted corresponding to the electrodes 12. The wires 13 are respectively provided corresponding to the unit cells 12a of the electrodes 12, the openings of the unit cells 12a are directed toward. The central position in such a manner that the stylus ends and the edges of the openings of the unit cells are arranged at a predetermined interval. Magnets $M_3$ are arranged at the ends of the openings of the respective unit cells. The magnet $M_3$ is formed of ferrite in the same honeycomb shape as the opening ends as described above, and the pole states are such that the front end faces of the wires 13 are magnetized to be S-poles and the back surfaces thereof are N-poles in the same manner as the magnet $M_1$. The electrodes 2 are, for example, made of aluminum and constructed that the size $d_2$ of the unit cell 12a is approx. 20 mm and the length $l_2$ of the cylindrical electrode 12 is approx. 5 to 100 mm. When the electrodes 12 are made of aluminum, it is advantageous by reducing the production cost.

The corona discharging operation between the wires 13 and the electrodes 12 and the ion accelerating operation by the magnets $M_3$ are substantially similar to those of the first embodiment. The velocity and air pressure of the air flow thus generated can be further increased by approx. 20% as compared with the case of the first embodiment having the same applied voltage value. This is because the arrangement of the electrodes is more densely performed for the wires.

In the embodiments described above, the sectional shape of the unit cells are formed in hexagonal shape. However, the present invention is not limited to this particular case. For example, other shapes such as a square shape as shown in FIG. 8 may also be employed, and a circular shape as shown in FIG. 9 may also be adopted. More particularly, the honeycomb shape of the electrodes of the above embodiment includes the shapes other than the hexagonal shape of the unit cell within the scope of the present invention.

What is claimed is:

1. An air flow generating apparatus comprising:
   a casing having an airflow inlet and an airflow outlet;
   a plurality of electrode plates having edges with a length and arranged at a predetermined interval from each other to form air flow passages in said casing, said interval having a central portion;
   ionizing wires disposed at a predetermined distance from said central portions of said respective intervals between said electrode plates on an extension line displaced a distance from a line connecting said edges of said electrode plates, for producing a corona discharge between said electrode plates and said wires; and
   rod-shaped magnets each having a front surface and a back surface, each said magnet being attached at said back surface to said edge of a respective electrode plates along said entire length of said edge, for magnetically accelerating ions produced by said corona discharge.

2. The air flow generating apparatus as defined in claim 1, wherein said front and back surfaces of each of said magnets have opposite polarity.

3. The air flow generating apparatus as defined in claim 1, wherein said front surface of said magnet has south poles while said back surface has north poles.

4. The air flow generating apparatus as defined in claim 1, wherein each of said magnets has two ends having opposite polarities from each other.

5. An air flow generating apparatus comprising:
   a plurality of hollow electrodes of honeycomb-shaped cross section having a plurality of unit cell spaces each having openings and end edges and functioning as air flow passages,
   a plurality of stylus-shaped ionizing wires arranged at a predetermined distance from said end edges of said openings of said unit cells and disposed toward the openings of the unit cells for producing a corona discharge between said electrodes and said wires, and
   a plurality of magnets each having a front surface and a back surface, said magnets being attached at said back surface to all of said end edges of said openings of said unit cells for magnetically accelerating ions produced by said corona discharge.

6. The air flow generating apparatus as defined in claim 5, wherein each of said hollow electrodes has a hexagonal cross-section.

7. The air flow generating apparatus as defined in claim 5, wherein each of said hollow electrods has a square cross-section.

8. The air flow generating apparatus as defined in claim 5, wherein each of said hollow electrodes has a circular cross-section.

* * * * *